J. H. STRUNK.
AUTOMATIC SAFETY APPLIANCE FOR RAILWAYS.
APPLICATION FILED JUNE 19, 1919.
1,387,331.
Patented Aug. 9, 1921.
4 SHEETS—SHEET 2.
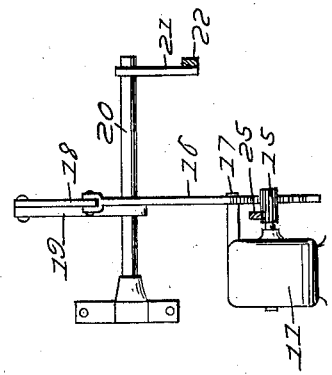
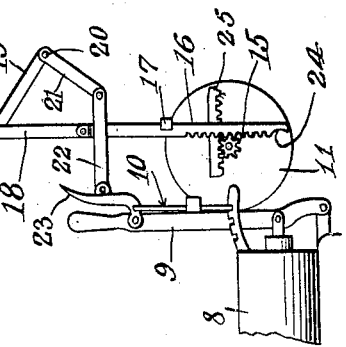
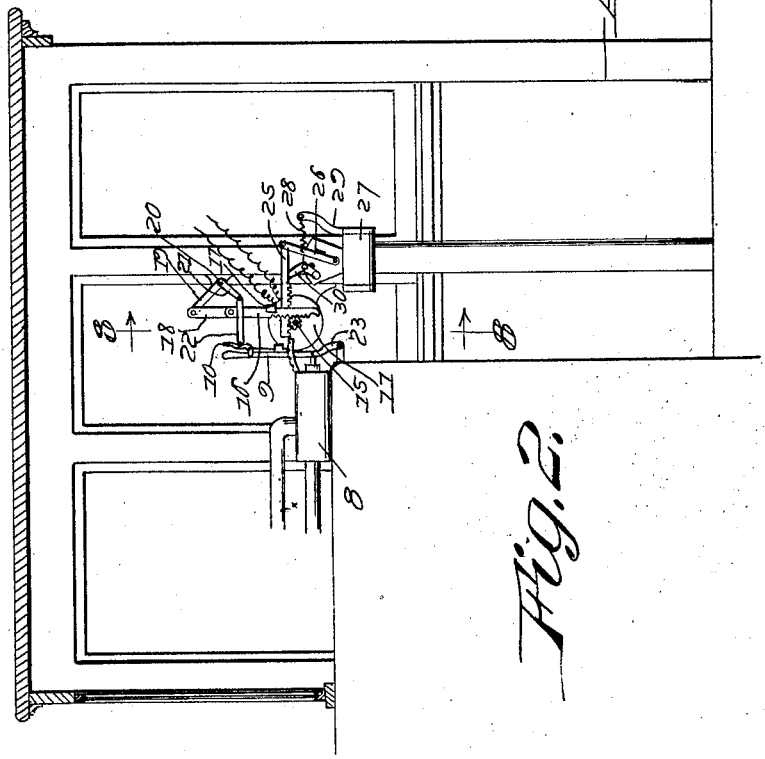
Inventor
John H. Strunk,
By
Attorney J. H. STRUNK.
AUTOMATIC SAFETY APPLIANCE FOR RAILWAYS.
APPLICATION FILED JUNE 19, 1919.

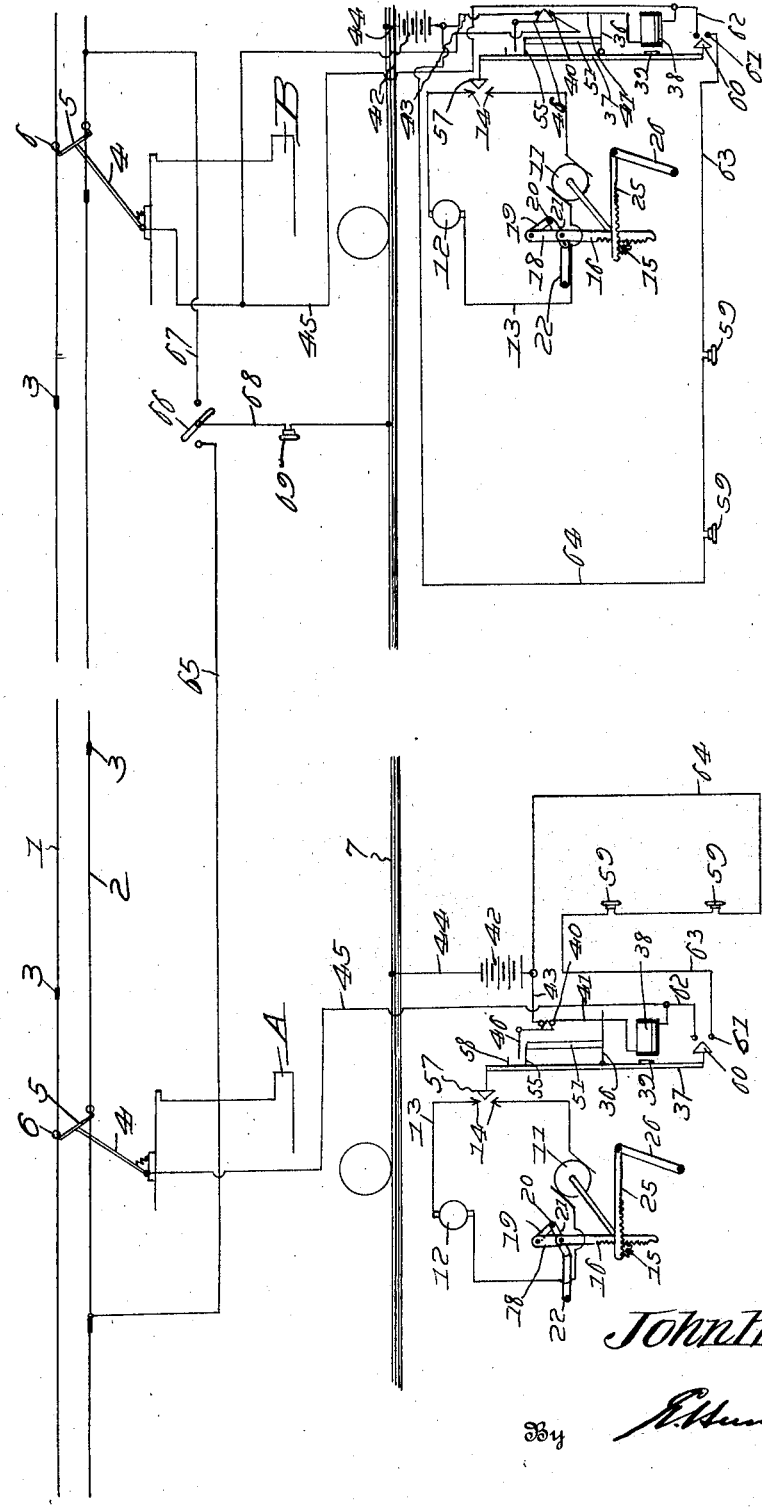

1,387,331.

Patented Aug. 9, 1921.
4 SHEETS—SHEET 3.

Inventor
John H. Strunk,
By
Attorney

J. H. STRUNK.
AUTOMATIC SAFETY APPLIANCE FOR RAILWAYS.
APPLICATION FILED JUNE 19, 1919.
1,387,331.
Patented Aug. 9, 1921.
4 SHEETS—SHEET 4.
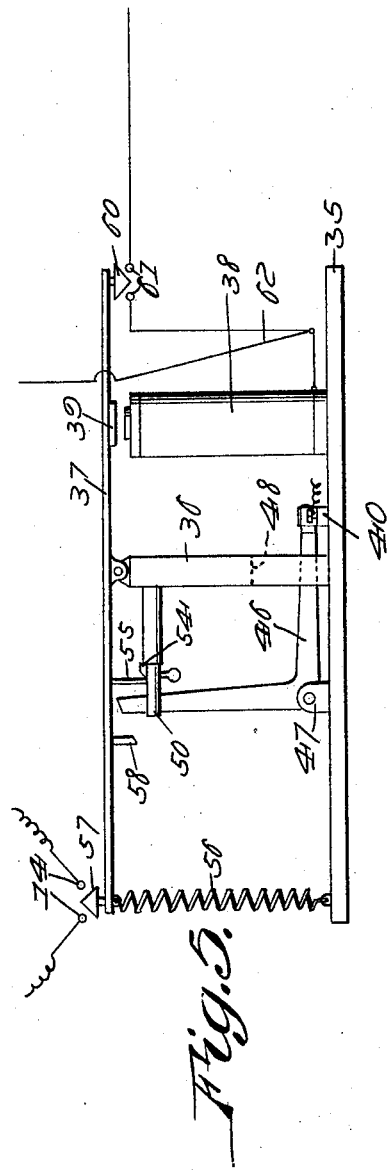
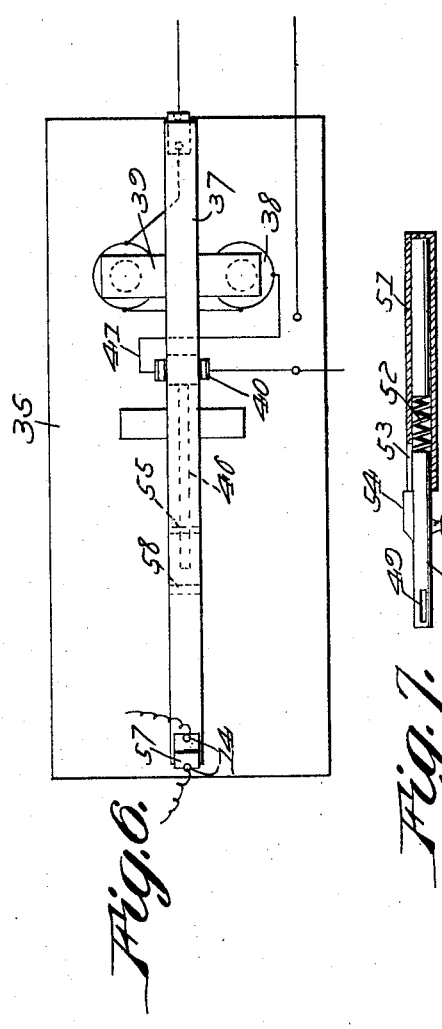
Inventor
John H. Strunk,
By
Attorney

UNITED STATES PATENT OFFICE.

JOHN H. STRUNK, OF JACKSONVILLE, FLORIDA.

AUTOMATIC SAFETY APPLIANCE FOR RAILWAYS.

1,387,331.  Specification of Letters Patent.  Patented Aug. 9, 1921.

Application filed June 19, 1919. Serial No. 305,230.

*To all whom it may concern:*

Be it known that I, JOHN H. STRUNK, a citizen of the United States, residing at Jacksonville, in the county of Duval and State of Florida, have invented new and useful Improvements in Automatic Safety Appliances for Railways, of which the following is a specification.

It is the purpose of the invention to provide a method of and means for the protection of moving trains, so that rear end as well as head on collisions of railways may be avoided. To this end the invention comprises the employment of dual overhead conductors with which contact is made by a trolley designed to be carried by the locomotive or power car of each train. The overhead conductors are formed each in sections which are electrically insulated from each other, the points of insulation on the two conductors being staggered with reference to each other, so that the insulated points on the one are opposite the medial points of the sections comprising the other. The trolley contacting with the two conductors, no two trains can approach each other closer than the length of one section without the trolleys of the two contacting with the same section of one of the overhead conductors. With this condition obtained, apparatus carried in the locomotive cab, or in the motor car, and operatively connected with the throttle and with the air brake system, is thrown into operation by electrical means carried in the cab or motor car and operated by an electrical supply source carried in the cab or motor car.

Further than providing means for automatically stopping trains when within prescribed distances from each other, the invention further contemplates means for connecting telephonically trains or cars within the same danger zone and provision is made for telephonically connecting trains with a station when within a prescribed distance from the station, this latter means also providing for the station attendant automatically stopping a train when occasion demands it.

Aside from the main purpose mentioned above, the invention seeks provision of a means of the above mentioned character which is simple in construction, durable and effective in operation and inexpensive to manufacture and apply.

While illustrated and described in a specific embodiment, the invention is not to be restricted to such embodiment. The right is reserved to make such changes or alterations as the actual reduction to practice may suggest, in so far as such changes or alterations are compatible in spirit with the annexed claims.

The same numerals of reference designate the same parts throughout the several figures of the drawing, wherein:

Figure 1 is a diagrammatic view of the apparatus comprising the invention.

Fig. 2 is a view showing the interior of an engine cab and illustrating in side elevation that part of the apparatus which is operatively connected with the throttle and with the air control mechanism.

Fig. 5 is a side elevational view of the relay employed to throw into operation the throttle closing and air control elements of the invention.

Fig. 6 is a top plan view of the structure of Fig. 5.

Fig. 7 is a longitudinal sectional view through the switch opening plunger carried by the relay.

Fig. 8 is a section on the line 8—8 of Fig. 2.

Fig. 9 is an enlarged side elevational view of the throttle valve operating connections.

Figure 4:
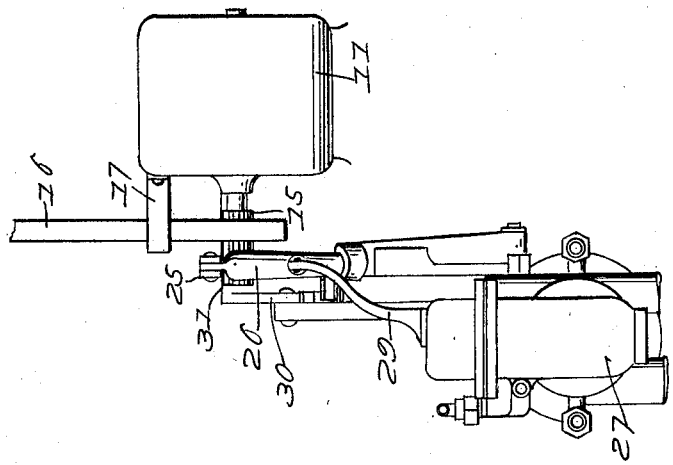
Fig. 4 is an end elevational view of the structure of Fig. 3.

As illustrated diagrammatically in Fig. 1, the invention comprises the dual overhead conductors 1 and 2, each comprising a plurality of sections insulated, as indicated at 3. The insulating joints 3 of the conductor 1 are staggered with reference to those of the conductor 2 and the insulated joints of each conductor stand opposite the medial points of the sections of the opposite conductor. In the drawings there are indicated diagrammatically locomotives A and B each of which carries a trolley 4 having at its upper end a transverse bar 5 at whose extremities there are carried the trolley wheels 6 which engage the two overhead conductors 1 and 2. It is apparent that the two locomotives thus equipped approaching each other, or the one following the other, will, when within a distance of each other equal to the length of one of the sections comprising either of the two overhead conductors, bring their trolleys upon the same section—that is within the two insulating joints 3 at the two ends of that section. When this condition obtains, a metallic circuit is provided through that section, through the two trolleys on the two locomotives and through the track 7 on which the locomotives run, the trolleys on the two being electrically connected with the tracks through intermediate devices in the cab and operatively connected with the throttle and with the air brake system, as appears hereinafter.

While the invention is herein shown and described as being applied on locomotives, it is applicable with equal effectiveness to fast and heavy electric railway service and needs only to have the throttle closing mechanism connected to the motor car controller to throw the controller to the off position. Since the equipment in each locomotive cab is alike, the description of one will suffice for the other.

Figure 3:
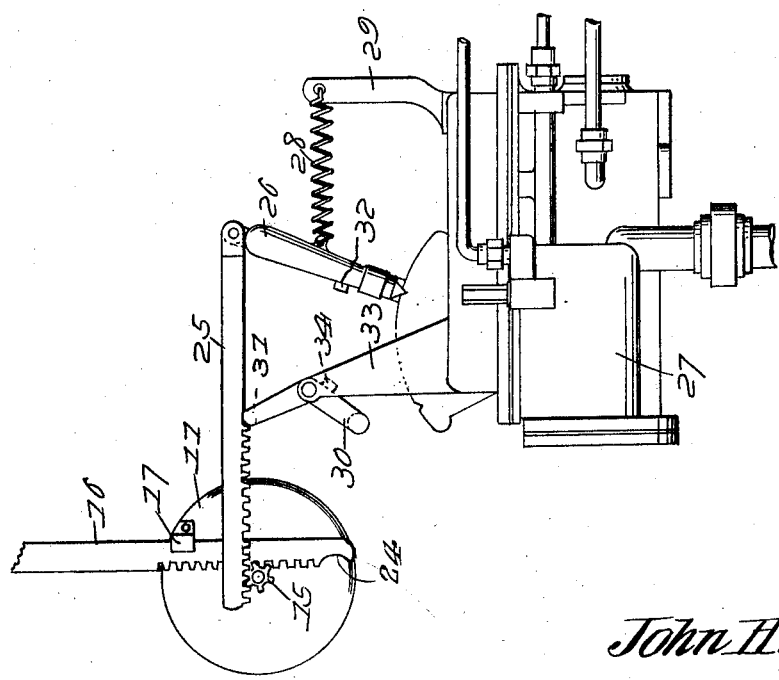
Fig. 3 is an enlarged side elevational view of that part of the mechanism connecting with the air control lever.

In Figs. 2, 3, 4 and 8 the equipment is clearly illustrated. The throttle 8 employs the usual lever 9 equipped with a spring latch 10 for holding it in various positions. It is designed to have the throttle lever operated manually as is usual, but to have it automatically close the throttle in the event of two trains coming into the same danger zone which is defined by the length of the sections comprising each overhead conductor. A motor 11 acts as the operating medium for closing the throttle and this motor is operated from current derived from a generator 12 which may be easily employed on locomotives for keeping the electric headlight in operation. Such generators are usually driven from a small turbine mounted on top of a boiler and it is obvious that the generator may be employed for operating this motor 11 as well as for operating the headlight. The generator 12 and motor 11 are included in a local circuit, indicated at 13 in Fig. 1 and this local circuit is normally open, being closed when necessary by effecting a metallic connection between the contact points 14. The motor 11 is preferably a slow speed motor and carries on its shaft a pinion 15 with which there meshes a rack bar 16, the latter having its teeth held in working engagement with the pinion by means of a guide 17 mounted on the motor casing. This rack bar 16 connects by means of a link 18 with an arm 19 which is mounted on a rock shaft 20 carried in suitable bearing brackets mounted in the engine cab. This rock shaft 20 carries a second arm 21 angularly disposed with reference to the arm 19 and this second arm, at its end, is pivotally connected to one end of a link 22 whose remaining end is pivotally connected to the release lever 23 of the latch 10. As viewed in Fig. 2, the rotation of the motor is left handed. When the lever 9 is positioned to have the throttle valve 8 open, it will stand, as shown in Fig. 2. In moving the lever to this position, the rock shaft 20 will have been rocked in a left handed direction with the consequent swinging of the arms 19 and 21 in an anti-clockwise direction and the forcing downward of the rack bar 16 which obviously turns the motor 11 in a right handed direction as viewed in Fig. 2. This is possible when the circuit controlling the motor 11 is inoperative as it will be except when the trolleys of two locomotives engage a common section of one of the overhead conductors. Assuming the throttle valve to be open, its lever 9 will be thrown as shown. Let the circuit controlling the motor be closed, as it will when a metallic connection is made between the contact points 14 which is effected by the relay later described, the motor will rotate in a left handed direction. The rack bar 16 will be raised, thereby, the arms 19 and 21 being swung to the left. This swinging of the arm 21 will, through the link 22, effect a pressure upon the latch release lever 23, thus releasing the latch 10 from engagement with its attendant rack, whereupon the pressure, being continued by the continued operation of the motor, will cause the lever 9 to be thrown to the left, as viewed in Fig. 2, and the throttle valve 8 to be closed. When the rack bar 16 has been elevated to a point where it effects the closing of the throttle 8, the pinion 15 will reach a semicircular recess 24 formed in the same edge of the rack bar as the teeth, but formed where the teeth terminate. The rack bar being raised to a point where the pinion can reach this recess the pinion may turn freely without imparting longitudinal movement to the bar since it has ceased to mesh with the teeth thereof.

The pinion 15 is of great enough width of face to permit its meshing with and operating a rack bar 25 in addition to the rack bar 16. The latter bar is vertically disposed but the former bar is horizontally disposed and at one end is pivotally connected to the upper end of the lever 26 which controls the air brake valve 27. This lever 26 is held normally in inoperative position by means of a spiral spring 28 which is tensioned between it and an arm 29 mounted on the control valve 27. Obviously the rotation of the motor 11 which, being left handed as viewed in the drawings, will serve to swing the lever 26 to the left against the tension of the spring 28, such swinging of the lever 26 effecting the operation of the air brake system with the consequent setting of the brakes on the several units comprising the train. Since it is impractical to stop the motor immediately it has drawn the lever 26 to its extreme left handed position, means are provided for throwing the rack bar 25 out of mesh with the pinion 15 when the lever 26 has been moved to the desired point to the left. This means comprises a bell crank lever 30 at the extremity of each of whose arms there is a lateral projection 31, the one lying close to the under edge of the rack bar 25 and the other positioned to engage a projection 32 carried by the lever 26. In the normal position of the bell crank lever 30, the rack bar 25 may mesh with the pinion 15 without its under edge coming in contact with the lateral projection 31. The bell crank lever is pivotally mounted on a support 33 carried by the air valve 27 and a lug 34 is engaged by the bell crank lever to retain the latter in normal position. As the lever 26 is thrown to the left, its projection 32 impacts with the coacting projection 31 on the bell crank lever, swinging the latter to turn on its pivot in a right handed direction with the result that lateral projection 31 adjacent the rack bar 25 engages the under edge of the latter and lifts it to throw its teeth out of mesh with the teeth of the pinion 15. When this operation has been performed the air system has been operated and the brakes set, whereupon the lever 26 may be returned to its normal position, which returning is effected by the spring 28. When the lever 26 is returned, the bell crank lever 30 drops back to its normal position and the rack bar 25 is permitted to be again thrown into mesh with the pinion 15, whereupon the lever 26 is again drawn forward for the operation of the air brakes, if the motor 11 has not in the meantime been brought to rest. The lever 26 will thus be operated practically the same as it is by hand for the setting of the brakes.

When the throttle lever 9 is to be operated manually, the rack bar 25 is raised by hand to throw it out of engagement with the pinion 15 while the throttle valve is being opened and when the latter has been opened to its desired position, the rack bar 25 is again thrown into mesh with the pinion, so that in the event of the automatic closing of the throttle valve, the air brake system may be operated.

For the purpose of closing the local circuit in which the motor 11 and the generator 12 are included a relay is provided and positioned at a convenient place in the cab. Since it is only electrically connected with the air brake and throttle operating mechanism, it need not be positioned adjacent the latter unless it is so desired. This relay (Figs. 5 and 6) comprises a base 35 upstanding from the center of which there is a standard 36. A lever 37 of substantially equal length with the base is pivoted at a medial point on top of the standard 36. To one side of the standard there is carried an electromagnetic couple 38, the armature 39 of which is attached to the lever 37 and disposed transversely with reference thereto. Between the magnet 38 and the standard 36 a pair of clips 40 is carried on the base. One terminal of the magnetic couple is connected to one of these clips by a wire 41 while the other of the clips connects with one terminal of a battery 42 by means of a wire 43. The other terminal of the battery 42 is connected to the track 7 by a wire 44. A wire 45 connects the trolley 4 with the remaining terminal of the magnetic couple 38.

Normally electrical connection is maintained between the clips 40 and this is done by means of a bell crank lever 46 which is pivotally mounted between ears 47 carried by the base 35, one arm of this bell crank lever passing through an appropriate opening 48 formed in the standard 36 and engaging between the two clips. The remaining arm of the lever 46 stands in an upright position and passes through a slot 49 formed in the extremity of a pin 50 which is slidably mounted in a tubular member 51 carried by the standard 36 and points in the direction of the length of the base of the latter. The tubular member 51 is mounted on the opposite side of the standard from the magnetic couple and its pin 50 is spring actuated, the spring 52 being housed in the tubular member and bearing against the inner end of the pin 50, tending normally to force the latter outward. With the spring free to act, the pin 50 is forced outward and rocks the bell crank lever on its pivotal connection, thereby raising that arm of the lever which engages the two clips 40 and withdraws it from contact with the clips to break electrical connection between these points.

In the normal position of the lever 37, it is designed to hold the spring 52 inert and to this end the tubular member is formed with a slot 53 in which a rib 54 slides, the rib being connected to the pin 50. This rib 54 precludes angular movement of the pin in its tubular member and when the pin is forced far enough into the tubular member to effect the engagement of the bell crank lever with the clips, the end of the rib is engaged by a depending arm 55 mounted on the under side of the lever 37. A spring 56 tensioned between one extremity of the lever 37 and the base 35 keeps the lever 37 normally depressed on this end and thereby keeps the arm 55 in contact with the rib 54 thereby holding the pin 50 in a position where it will hold the bell crank lever in engagement with the clips 40. The spring 56 acts in opposition to the force actuated by the magnetic couple 38 when the latter is energized, therefore to energize the magnets 38 is to cause the armature 39 to be attracted with the result that the lever 37 is rocked on its pivotal connection to disengage the arm 55 from the rib 54, when the spring 52 operates to rock the bell crank lever 46 and lift the arm of the latter out of contact with the clips 40. This action of the lever 37, aside from interrupting electrical continuity between the clips 40, is designed to close the local circuit in which the motor 11 and the generator 12 are included and to this end it carries a foot 57 on its upper face directly above the spring 56 and this foot, on the raising of this end of the lever, is brought into contact with the two contact members 14 to close the local circuit for the operation of the throttle and air brake mechanism.

Since the clips 40 are serially connected with the magnets 38, the raising of the switch arm of the bell crank lever 46 will open the circuit of the magnets 38, the spring 56 will then operate to draw down that end of the lever 37 to which it is connected, thus opening the local circuit almost immediately after it has been closed. To provide for maintaining the local circuit intact, even after the magnets 38 cease to operate, there is provided on the under face of the lever 37, between the arm 55 and the spring 56, a lug 58 under which the upper end of the vertical arm of the bell crank lever 36 engages when the latter is forced outwardly by the spring 52 and pin 50. The engaging edges of the lug 58 and vertical leg of the lever 46 are correspondingly beveled, so that the farther the leg is forced outwardly the tighter the foot 57 will be forced into contact with the contacts 14. Thus it will be seen that once the magnets 38 operate the lever 37, the latter is held in a position where it closes the local circuit of the motor 11, allowing the latter to operate for the purpose specified.

Since each train or unit must carry its own current generating means for actuating the circuit controlling the air and throttle actuating devices and since these current generating means must operate on a common circuit some arbitrary method must be adopted for their cells. Therefore where two different trains or units have current generating devices of the same voltage—for example batteries containing the same number of cells, it is necessary for these generating units to be connected respectively to the rail and the trolley so that they will actuate in series when the two trains or units are on the same block. Where the number of cells or the voltage in the generating units differs between any two trains, the positive terminals of both may be connected to the same side of the line—that is, to the trolley and to the wire respectively. By this arrangement, two succeeding trains will have their current generating units either connected in parallel or in series. If the former arrangement or connection is effected by two succeeding trains coming on to the same block, the one having current generating apparatus of predominating voltage will have the excess voltage effective in the circuit for operating the device. If the current generating devices are thrown in series by two succeeding trains coming on the same block the voltages of both will be effective in operating the circuits.

In Fig. 1 assume the two locomotives A and B to be moving in the same direction and the locomotive B to be gaining on A until eventually its trolley 4 will move on to the same section of one of the overhead conductors with which the trolley of the locomotive A is in contact. In the drawings the positive terminal of the battery 42 of the locomotive B is connected to the track and the negative terminal of the battery 42 of the locomotive A so connected. Prior to the two locomotives bringing their trolleys on to the same section of the overhead conductor, the relay will have its parts disposed as in Fig. 5—that is, the foot 57 will be out of contact with the contacts 14 and the armature elevated from the magnets 38, the pin 50 being held in a position to cause the bell crank lever to effect electrical contact between the clips 40. With the battery 42 of the locomotive A as a starting point, current will travel from this battery over the wire 43 to one of the clips 40, across the bell crank lever 46 to the other clip 40, thence along the wire 41 to the magnetic couple, thence over the wire 45 to the trolley 4, along that section of the overhead conductor with which the two trolleys are in contact, thence to the trolley 4 of the locomotive B, over the wire 45 of the latter, to and through the winding of the magnet 38, to contacts 40, the battery 42, the wire 44 and the rail 7 back to the battery 42 of the locomotive A, the two batteries being in series so that their combined voltage is effective. This condition obtaining, the magnetic couples of the two locomotives will be energized with the result that the levers 37 will be operated to close the local circuits in the two locomotives for the operation of closing the throttle valve and operating the air brake control mechanism.

To provide for inter-communication between two locomotives stopped in this manner, a telephone 59 is provided on each, and if desired a plurality of phones may be serially grouped on the train drawn by each locomotive one of the phones in each car or every other car, as desired. To provide for operatively connecting these phones, the lever 37 carries a foot 60 on its under face at the end opposite the foot 57 and this foot engages between two contacts 61, one of which is electrically connected to the wire 45 by a wire 62. The other contact 61 is connected to the phone 59 by the wire 63 and the phone 59 is connected to the wire 43 by a wire 64. When the lever 37 is drawn downward and the bell crank lever 46 operated as before described, the foot 60 is maintained in contact with the two contacts 61, and this occurring on both trains will throw the phones 59 in the two into connection with each other. The operation of the bell crank lever 46 will open the circuit of the magnet 38 but a new circuit is established and assuming the current to travel from the battery of the locomotive A it passes from the latter over the wire 43, over the wire 64, through the phone 59, over the wire 63, from one contact 61 to the other across the foot 60, thence over the wire 62, the wire 45, the trolley 4, over the overhead conductor and through the apparatus on the locomotive B, the parts of the apparatus having the same relative positions and the current the same relative direction of travel as have been described in regard to the locomotive A. Thus the two locomotives are connected so that the engineer or motorman of the one may communicate with the other.

To provide means to enable a station operator to stop a train in the vicinity of or close to his station and to communicate with the engineer or motorman of the latter, a line wire 65 is provided and led from one terminal of a switch 66 to one of the line wires 1 or 2, this wire 65 being attached to one of the sections of the said line wires. Leading in the opposite direction from the station there is a second line wire 67 which connects with one of the other sections of the line wires. The switch 66 is a three point switch and its remaining terminal is connected to the track 7 by a wire 68 in which a phone 69 is serially connected. Should a train be leaving or advancing toward a station and the station attendant desires to stop the train before it reaches the station, if it is advancing toward the station or to stop it before it gets a certain distance away from the station, if it is leaving the latter, he throws his switch 66 to electrically connect the line 68 with the line 65 and to connect the line 68 with the line 67. Obviously electrical connection of the lines 68 and 67 and 68 and 65—since the turning of the switch 66 effects both these connections—will serve to operate the throttle closing and brake operating mechanism just as does the approach toward each other of two trains or locomotives. The attendant in the station, therefore, has at his command means for immediately stopping the trains. If the train be approaching the station and the switch 66 turn to electrically connect the lines 65, 68 and 67, the battery of the locomotive B will be effective in setting up a current which will travel from the opposite terminal of the battery to the rail 7, thence through the telephone apparatus 69, the wire 68, the switch 66, the wire 67, the trolley wire 3, the trolley 4, the wire 45, the magnet 38, the contact points 40 and back to the battery. The stopping mechanism will thus be actuated upon movement imparted to the lever 37 by the magnet 38. But such a movement effects an opening in the aforesaid circuit between the contacts 40 by the shifting of the lever 46 to its open position heretofore described and communication between the locomotive B may be had because of the closing of the circuit at the contact 61 by the operation of the lever 37, the course of the current being over the wire 7, to the receiver 69, the wire 68, the switch 66, the wire 67, the trolley wire 3, the trolley 4, the wire 45, the wire 62, the two contacts 61 with the interposed contact 60, the wire 63, the receivers 59, the wire 64, and back to the battery 42. If the locomotive A be within range of the station, it will be stopped and communication set up between it and the station in the same way.

The invention having been described, what is claimed as new and useful is:

1. The combination with the throttle valve of a locomotive, of a motor, means for operating the motor, a rock shaft, operative connections between the rock shaft and the throttle, a rack bar, operative connections between the rack bar and the rock shaft and a pinion carried by the motor and meshing with the rack bar, so that when the motor is operated the rack bar may effect movement of the rock shaft for the closing of the throttle.

2. The combination with the air brake controlling valve of a locomotive, the air brake valve having an operating lever, of a motor, a spring connected with said lever and tending to hold the same in inoperative position, a rack bar pivotally connected to the lever, a pinion carried by the motor and meshing with the rack bar, whereby the turning of the motor will effect movement of the rack bar for bringing the lever to an operative position and automatic means for disengaging the rack bar from the pinion to allow the spring to return the lever to inoperative position.

3. The combination with the throttle and the air brake control valve of a locomotive, of a motor, means for operating said motor, a pinion carried by the said motor, a pair of rack bars meshing with said pinion, and operative connections between one rack bar and the air brake control valve and the other rack bar and the throttle, whereby the operation of the motor may effect the closing of the throttle, and the operation of the valve for the purpose specified.

4. The combination with an air brake control valve of a locomotive, of a motor, means for operating said motor, the air brake valve having an operating lever, resilient means tending to hold the operating lever in inoperative position, a rack bar having one end pivotally connected to the lever, a pinion carried by the motor and meshing with the rack bar whereby movement of the motor in any direction will effect swinging of the lever to operative position, a pivotally mounted bell crank lever having a lateral projection at the extremity of one of its arms for engagement with the rack bar, and means carried by the lever and engageable with the extremity of the other arm of the bell crank lever when the operating lever is moved to operative position, whereby the rack bar may be disengaged from the pinion for the purpose specified.

5. The combination with the throttle valve of a locomotive, of a motor, means for operating the motor, a rock shaft, operative connections between the rock shaft and the throttle, a rack bar, operative connections between the rack bar and the rock shaft, and a pinion carried by the motor and meshing with the rack bar so that when the motor is operated the rack bar may effect movement of the rock shaft for the closing of the throttle, the rack bar being formed adjacent one terminal with a semi-circular recess which the pinion enters due to movement of the rack bar, further movement of the rack bar by the pinion being precluded when the pinion enters said recess.

6. The combination with the throttle valve of a locomotive, of a motor, means for operating the motor, a rock shaft, a pair of arms carried by the rock shaft and angularly disposed with reference to each other, a link connecting one of said arms with the throttle, a rack bar, a link connecting the rack bar with the other of said arms, and a pinion carried by the motor and meshing with the rack bar so that when the motor is operating the rack bar may effect movement of the rock shaft for the closing of the throttle.

7. The combination with the throttle of a locomotive, of a motor, an automatically controlled circuit for actuating the motor, a rock shaft, operative connections between the rock shaft and the throttle, a rack bar, operative connections between the rack bar and the rock shaft, means for supporting the rack bar for longitudinal movement, and a pinion carried by the motor and meshing with the rack bar so that when the motor is operated the rack bar may effect movement of the rock shaft for the closing of the throttle.

In testimony whereof I affix my signature.

JOHN H. STRUNK.